US010817793B1

(12) United States Patent
Duckworth et al.

(10) Patent No.: US 10,817,793 B1
(45) Date of Patent: Oct. 27, 2020

(54) USER-TAILORED RECOMMENDATIONS

(71) Applicant: dopl inc, Seattle, WA (US)

(72) Inventors: Dennis Duckworth, Seattle, WA (US); Yong Hui Ma, Seattle, WA (US); Fran Duckworth, Seattle, WA (US); Dillon Hicks, Seattle, WA (US); Grant Hogan, Seattle, WA (US)

(73) Assignee: dopl inc., Seattle, WA (US)

( * ) Notice: Subject to any disclaimer, the term of this patent is extended or adjusted under 35 U.S.C. 154(b) by 1025 days.

(21) Appl. No.: 14/719,207

(22) Filed: May 21, 2015

(51) Int. Cl.
*G06N 5/04* (2006.01)
*G06N 7/00* (2006.01)

(52) U.S. Cl.
CPC ............ *G06N 5/045* (2013.01); *G06N 7/005* (2013.01)

(58) Field of Classification Search
CPC ............................... G06N 5/045; G06N 7/005
See application file for complete search history.

(56) References Cited

U.S. PATENT DOCUMENTS

| | | | | |
|---|---|---|---|---|
| 6,904,408 B1* | 6/2005 | McCarthy | ............ | A61B 5/6815 |
| | | | | 705/2 |
| 2011/0320373 A1* | 12/2011 | Lee | ........................ | G06Q 50/01 |
| | | | | 705/319 |
| 2012/0233253 A1* | 9/2012 | Ricci | .................. | G06Q 30/0241 |
| | | | | 709/204 |
| 2013/0046772 A1* | 2/2013 | Gu | .................... | G06F 17/30029 |
| | | | | 707/751 |
| 2013/0151540 A1* | 6/2013 | Pathak | ................. | G06Q 10/101 |
| | | | | 707/754 |
| 2013/0226856 A1* | 8/2013 | Zhang | .................... | G06N 7/005 |
| | | | | 706/52 |
| 2014/0258309 A1* | 9/2014 | Young | ................. | G06F 17/3053 |
| | | | | 707/748 |
| 2015/0370798 A1* | 12/2015 | Ju | ........................ | G06F 16/9535 |
| | | | | 707/748 |
| 2016/0019280 A1* | 1/2016 | Unger | ............... | G06F 17/30646 |
| | | | | 707/736 |
| 2016/0196490 A1* | 7/2016 | Chandrasekaran | ......................... | |
| | | | | G06F 17/30554 |
| | | | | 706/50 |

OTHER PUBLICATIONS

Masthoff, Judith. "Group recommender systems: Combining individual models." Recommender systems handbook. Springer, Boston, MA, 2011. 677-702.*

* cited by examiner

*Primary Examiner* — Miranda M Huang
*Assistant Examiner* — Kevin W Figueroa
(74) *Attorney, Agent, or Firm* — Perkins Coie LLP

(57) ABSTRACT

A facility for producing an item recommendation for a selected user is described. The facility accesses an information resource that, for each of a number of buckets that each correspond to a different collection of personal information, identifies users for a members of the bucket into each of whom the entire collection of personal information applies. The facility selects a bucket among the plurality of buckets of which the selected user is a member. The facility accesses a number of item ratings that were each contributed by a member of the selected bucket other than the selected user. For each item rated among the accessed item ratings, the facility aggregates the ratings of the item. On the basis of items' aggregated ratings, the facility selects one or more rated items for recommendation to the selected user.

20 Claims, 25 Drawing Sheets

| restaurant id | name | address | telephone |
|---|---|---|---|
| 5657 | Tony's Grotto | 111 First Ave S. Seattle WA 98104 | 206-555-8797 |
| 5794 | Ferry Noodle House | 93 Columbia St. Seattle WA 98104 | 206-555-1357 |
| 5687 | Chez Bob | 123 First Ave S. Seattle WA 98104 | 206-555-1000 |
| 7154 | Super Burgers | 324 Yesler Seattle WA 98104 | 206-555-4545 |
| 2134 | RAW Burgers | 161 Second Ave. S Seattle WA 98104 | 206-555-8500 | restaurants table — 700
701, 702, 703, 704, 705
711, 712, 713, 714

FIG. 7

| user id | restaurant id | channel | date | atmosphere | clientele | service | food quality | overall |
|---|---|---|---|---|---|---|---|---|
| 116231 | 5687 | casual lunch | 4/11/2015 | | 5 | 3 | 5 | 1 | 3 |
| 995032 | 7154 | casual lunch | 4/13/2015 | | 1 | 4 | 3 | 4 | 4 |
| 879412 | 7154 | casual lunch | 4/11/2015 | | 5 | 2 | 4 | 5 | 4 |
| 995032 | 5687 | casual lunch | 4/6/2015 | | 2 | 4 | 4 | 4 | 4 |
| 879412 | 2134 | casual lunch | 4/9/2015 | | 5 | 2 | 2 | 5 | 5 |
| 879412 | 5657 | business dinner | 4/11/2015 | | 4 | 1 | 3 | 3 | 3 |
| 879412 | 5794 | happy hour | 4/13/2015 | | 4 | 4 | 5 | 5 | 5 | ratings table — 800

FIG. 8

USER-TAILORED RECOMMENDATIONS

TECHNICAL FIELD

The described technology is directed to the field of decision-support tools

BACKGROUND

Newspapers and magazines have long published editorial reviews of restaurants, bars, movies, books, cars, etc. These reviews generally offer one person's perspective on the suitability of the reviewed item.

More recently, websites and mobile apps have become available that allow any user to offer free-text reviews and ratings of similar items. Someone using these tools to decide whether to visit a restaurant can typically read all of the reviews and ratings of the restaurant accumulated from other users and see average ratings across all ratings of the restaurant.

BRIEF DESCRIPTION OF THE DRAWINGS

FIG. 7 is a table diagram showing sample contents of a restaurant's table used by the facility in some embodiments to store information about restaurants that the facility is able to recommend.

FIG. 8 is a table diagram showing sample contents of a ratings table used by the facility in some embodiments to store restaurant ratings contributed by users.

DETAILED DESCRIPTION

Figure 1:
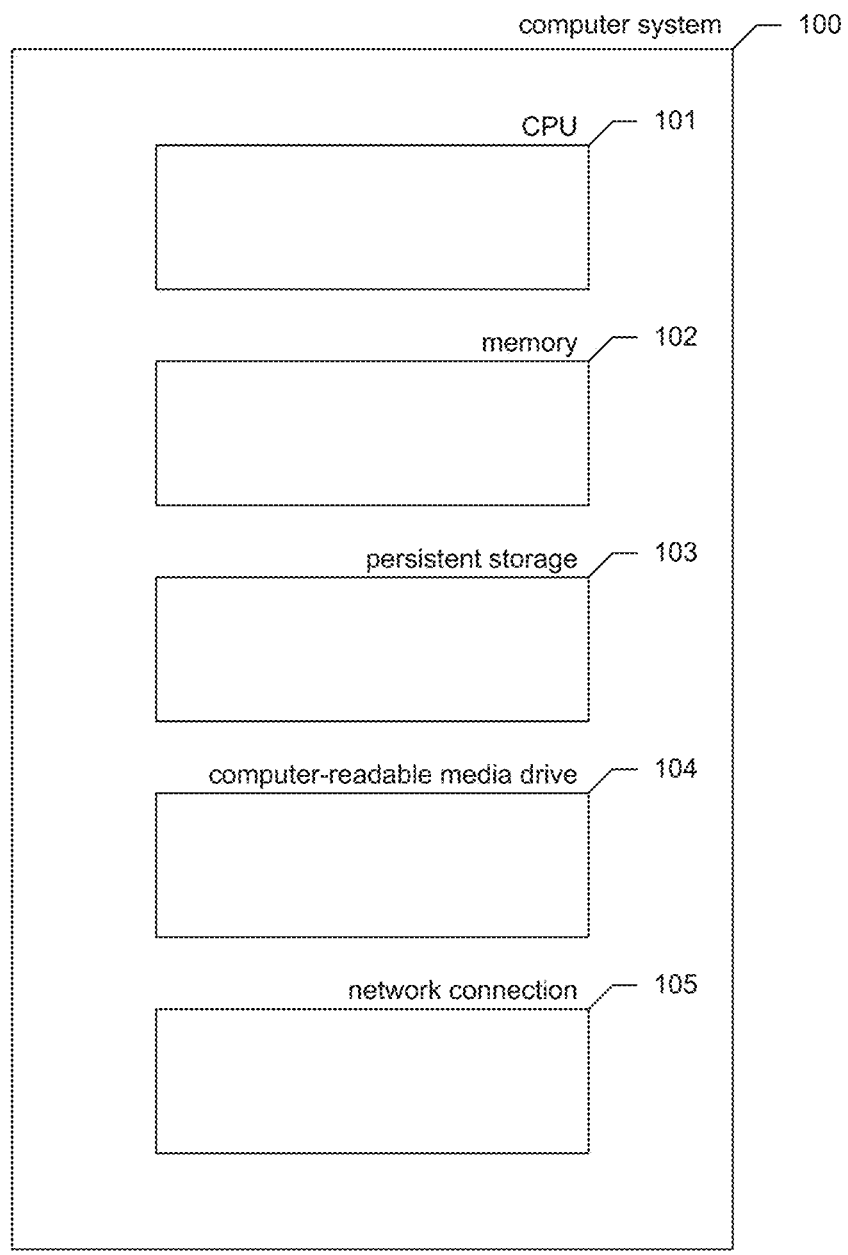
FIG. 1 is a block diagram showing some of the components typically incorporated in at least some of the computer systems and other devices on which the facility operates.

The inventors have recognized that conventional tools for supporting choices of restaurants, bars, movies, books, cars, etc. have significant disadvantages. In particular, these tools are invariably designed for the mass market, providing essentially the same information irrespective of their users' differing needs, preferences, and traits.

In order to overcome these disadvantages, the inventors have conceived and reduced to practice a software and/or hardware facility for providing user-tailored recommendations ("the facility"). In particular, the facility seeks to organize its users into a potentially large number of groups, or "buckets," designed to collect together users whose needs, preferences, and traits that are relevant to choosing an item are similar enough that choices and evaluations by some members of a bucket are predictive of the experience that other members of the bucket will have if they make the same choices. While the recommendation of restaurants is discussed extensively herein, in various embodiments, the facility recommends items of a wide variety of types, such as items of types including bars, movie theatres, concert venues, sports venues, vacation destinations, movies, television shows, televisions channels, books, magazines, blogs, airlines, cars, motorcycles, car rental agencies, salons, online merchants, brick-and-mortar merchants, political candidates, etc.

In various embodiments, the facility defines the buckets based upon various combinations of information about the users, including demographic information (e.g., age, sex, income, etc.), personality type (e.g., introverted-sensing-feeling-perceiving) preferences (e.g., "Do you enjoy loud places?"), subjectivity measures (e.g., "Do you regard libraries as loud places?"), and actions (e.g., restaurants chosen, ratings given, places visited, destinations traveled to).

In various embodiments, the facility obtains this information in various combinations of ways, including explicitly posing questions to users; inferring additional information from questions answered (e.g., from a positive answer to the question "I enjoy good late-night street vendor hotdog," an inference that the same user would negatively answer the question "is essential to you that restaurants be neat and tidy?"); and observing user actions that demonstrate certain information (e.g., a user repeatedly rating restaurants highly that are known to be loud, despite having answered an explicit question about sound levels in a way that indicates that the user does not like loud places).

In some embodiments, the facility organizes the buckets into a classifying decision tree data structure, in which each bucket is represented by a node. As the facility progresses in obtaining relevant information about a user, the facility navigates the user to nodes deeper and deeper in the decision tree, corresponding to progressively more fully-specified buckets of users, who have more and more in common. When seeking to recommend a restaurant to a user, the facility analyzes restaurant ratings from users in the same bucket. Where the user's bucket contains few restaurant ratings—either because there are few other users in the bucket, or because they have been relatively inactive in rating restaurants—the facility also uses restaurant ratings from users in buckets that are nearby in the tree, such as parent nodes and sibling nodes, or are otherwise similar.

In some embodiments, a user can tailor a recommendation to a particular dining scenario, or "channel," such as a business lunch, casual lunch, outside dining, happy hour, formal date, casual date, dinner with the kids, etc. In some embodiments, the facility tailors recommendations to channels by qualifying certain restaurant ratings by one or more channels to which they relate. For example, where a user rates a restaurant immediately after receiving it from the facility as a recommendation for the channel "business lunch," in some embodiments, that rating is qualified by the "business lunch" channel. In some embodiments, where the facility is recommending a restaurant to another user for the "business lunch" channel, the facility uses only ratings qualified with the "business lunch" channel, omitting or significantly discounting other ratings not so qualified.

In some embodiments, before combining ratings from users from the same or similar buckets, the facility uses a confidence level to adjust ratings to make them more applicable to the user to whom the recommendation is being provided. For example, a restaurant's service rating may be adjusted downward when given by a user who grades all restaurants highly on service, or has answered a question in a way indicating indifference to good service.

A user can rate a restaurant that the facility recommended to the user, or may rate a restaurant that the user visited for another reason. In some embodiments, the facility collects multiple categories of ratings for each restaurant rated by each user. For example, in some embodiments, the user rates a restaurant in some combination of these categories: atmosphere, clientele, service, quality of food, food quality vs. cost, food quantity vs. cost, and overall experience, such as by selecting a number of stars, typing a value, moving a slider, etc. In some embodiments, where the facility recommends a restaurant to a user, the facility indicates a score in each of these categories. In some embodiments, when the facility generates a restaurant recommendation for a user, it includes a quantitative probability that the user will enjoy the recommended restaurant.

In some embodiments, the facility periodically reorganizes its decision tree to more effectively distinguish between users with different tendencies toward restaurants, causing its new buckets and their members to be more predictive of what their members will like. In some embodiments, the facility merges buckets having similar ratings of the same restaurants, and splits buckets having divergent ratings of the same restaurants.

In some embodiments, the facility allows a user to receive recommendations for a hypothetical person who has different characterizing information, such as to select items that another person will enjoy. In some embodiments, the facility enables a user to share his or her profile with another user for this purpose.

In some embodiments, the facility provides recommendations to a group of users, indicating for each item a likelihood that each user in the group will like the restaurant. In some such embodiments, for at least one recommended restaurant, the facility generates a separate likelihood that each user in the group will restaurant the item. In some such embodiments, for each user in the group, the facility separately performs categorical aggregation of the ratings of the recommended restaurant contributed by other members of the user's bucket.

By behaving in some or all of these ways, the facility is able to provide recommendations for restaurants and items of a variety of other types that are highly relevant—and therefore frequently useful—to the users receiving the recommendations.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware. While computer systems configured as described above are typically used to support the operation of the facility, those skilled in the art will appreciate that the facility may be implemented using devices of various types and configurations, and having various components.

Figure 2:
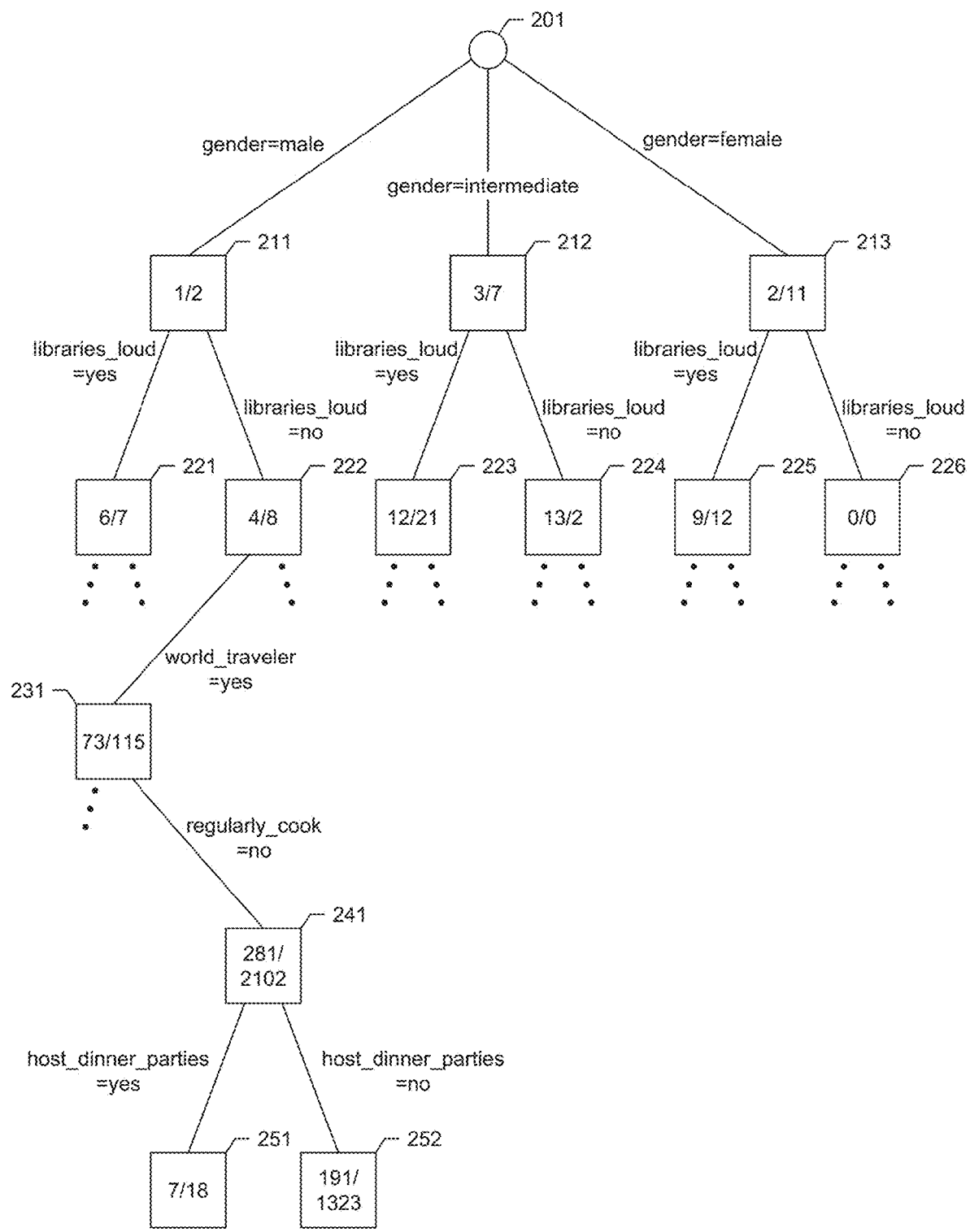
FIG. 2 is a data structure diagram showing a sample decision tree generated by the facility and used to make recommendations in some embodiments.

FIG. 2 is a data structure diagram showing a sample decision tree generated by the facility and used to make recommendations in some embodiments. Root node 201 is the starting point from which the facility navigates each user to their bucket. Three edges connect the root node to its child nodes at depth one in the tree: nodes 211-213. For users who answered a question to indicate that their gender is male, the facility traverses to depth 1 in the tree via the first edge to node 211; for users who answered a question to indicate that their gender is intermediate, facility traverses the second edge from the root node to node 212; and for users who answered a question to indicate that their gender is female, the facility traverses the third edge from the root node to node 213. For users for whom the facility navigates to node 211, if they answered a question to indicate that they regard libraries as loud, then the facility navigates to node 221 at depth two in the tree; for any of the users who reach node 211 who answer a question indicating that they do not regard libraries as loud, the facility navigates to node 222. Users who reached node 211 but do not answer a question about regarding libraries as loud or not remain at node 211. The notation "½" inside node 211 means that one user is a member of this bucket, and this user has contributed 2 restaurant ratings. Users who have answered all of the questions typically end up in a leaf node at the deepest level of the tree. For example, a user who answered questions indicating that their gender is male, they do not regard libraries as loud, they are a world traveler, they don't regularly cook, and they do host dinner parties would end up at leaf node 251. In order to make this example comprehensible, the decision tree is limited to a depth of five levels; in many embodiments, the facility generates and uses a decision tree of significantly larger depth.

In some embodiments, a user's position in the decision tree is affected by inferences drawn by the facility. For example, a user who had reached node 211 but had not explicitly answered a question about regarding libraries as loud may nonetheless be navigated to node 422 based upon his answer that he does not regard an audio recording of operating construction machinery as loud. A user's position in the tree may also be affected by actions he or she takes other than answering questions, such as rating restaurants, even where they contradict explicit answers given to questions by the same user. For example, a user who has answered a question to indicate that they are a world traveler might be moved from node 231 to a child of node 222 (not shown) that reflects that the user is not a world traveler if, during a certain extended period of time, the user does not appear to leave his or home state based upon his or her smartphone's report of GPS-indicated geographic location.

While FIG. 2 shows a tree data structure whose contents and organization are designed to make it more comprehensible by a human reader, those skilled in the art will appreciate that actual such data structures used by the facility to store this information may differ from the tree shown, in that they, for example, may be laid out in a different manner; may store different kinds of information; may be encoded in different ways; may be compressed, encrypted, and/or indexed; etc.

Figure 3:
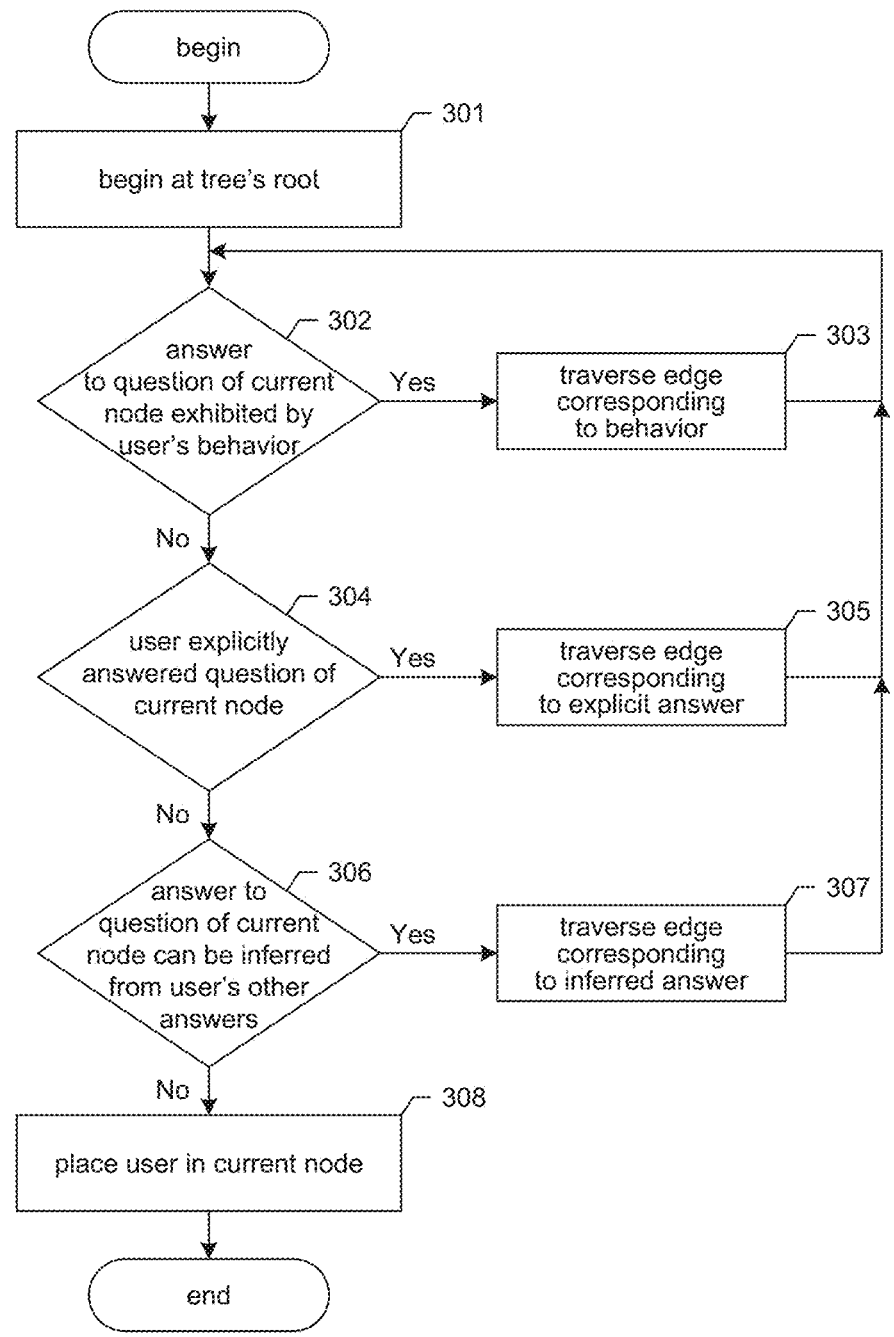
FIG. 3 is a flow diagram showing steps typically performed by the facility in order to assign each user to a particular bucket.

FIG. 3 is a flow diagram showing steps typically performed by the facility in order to assign each user to a particular bucket. The facility performs an iteration of these steps for a particular user, such a periodically; each time the user answers a question or takes other action that may affect the user's bucket assignment; etc. In step 301, the facility navigates to the tree's root node. In step 302, if an answer to the question posed by the current node is exhibited by behavior of the user, then the facility continues in step 303, else the facility continues in step 304. In step 303, the facility traverses from the current node via the edge corresponding to the user's behavior. After step 303, the facility continues in step 302. In step 304, if the user has explicitly answered a question posed by the current node, then the facility continues in step 305, else the facility continues in step 306. In step 305, the facility traverses from the current node via the edge corresponding to the user's explicit answer to this question. After step 305, these steps continue in step 302. In step 306, if an answer to the question posed by the current node can be inferred from other answers given by the user, then the facility continues in step 307, else the facility continues in step 308. In step 307, the facility traverses from the current node via the edge corresponding to the answer inferred for the user. After step 307, these steps continue in step 302. In step 308, the facility assigns the user to the current node. After step 308, these steps conclude.

Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; a shown step may divided into substeps, or multiple shown steps may be combined into a single step, etc.

Figure 4:
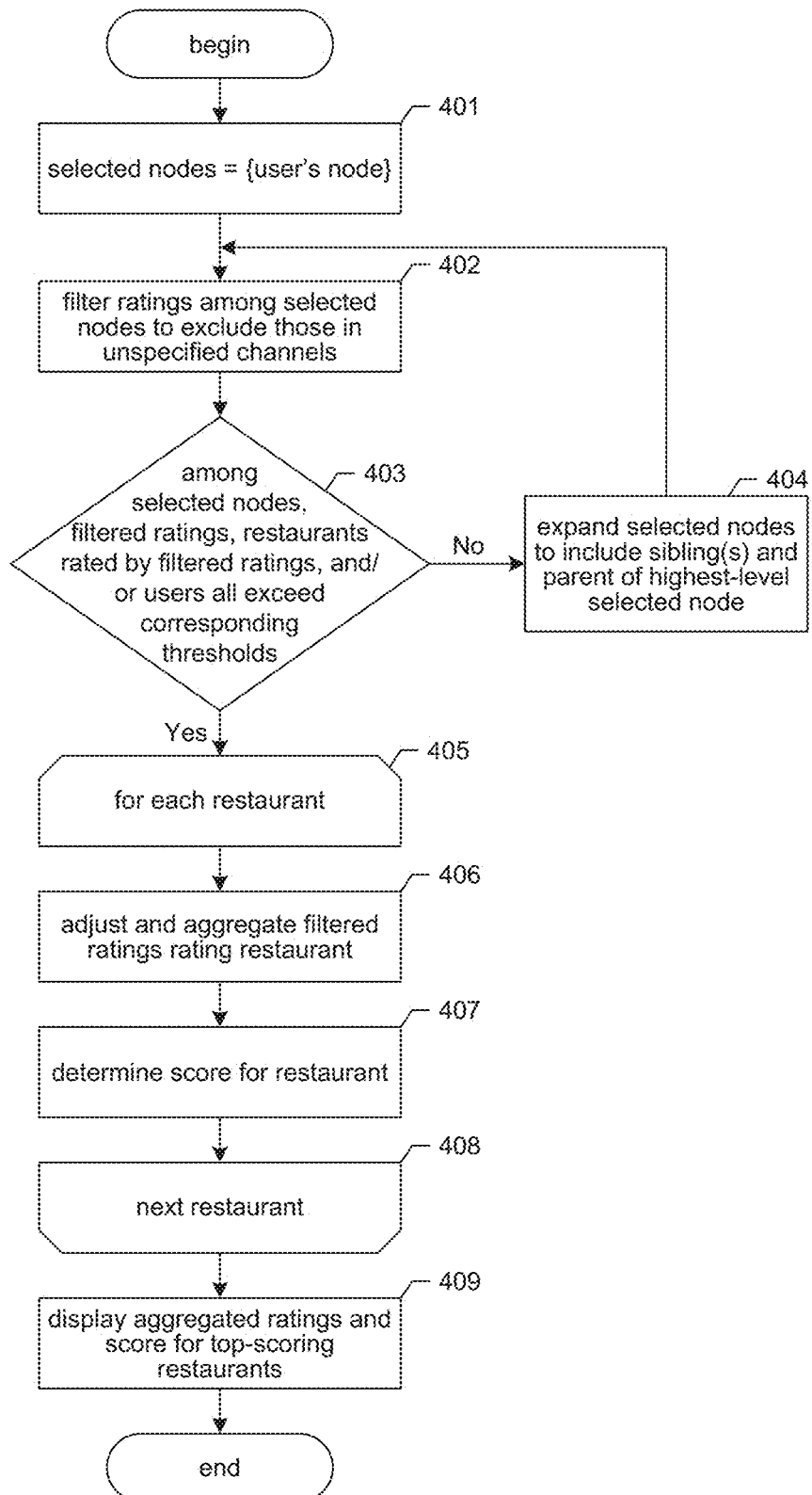
FIG. 4 is a flow diagram showing steps typically performed by the facility in some embodiments in order to generate a recommendation for a particular user.

FIG. 4 is a flow diagram showing steps typically performed by the facility in some embodiments in order to generate a recommendation for a particular user. The facility typically performs these steps for a user when the user explicitly requests a recommendation, when the facility predicts the user will want a recommendation, periodically, etc. In step 401, the facility assigns a group of selected nodes to include only the node to which the user is assigned. In step 402, the facility filters restaurant ratings contributed by users assigned to nodes among the selected nodes to exclude ratings that are qualified by channels not specified for this recommendation request. For example, for a recommendation request for the "business lunch" channel, the facility in step 402 filters out all restaurant ratings that were contributed for channels other than the "business lunch" channel. In step 403, if thresholds are satisfied by the number of ratings as filtered in step 402, number of restaurants rated by those filtered ratings, and/or number of users, then the facility continues in step 405 to proceed with the current set of selected nodes, else the facility continues in step 404 to expand the set of selected nodes. In step 404, the facility expands the set of selected nodes to include any siblings of the currently highest-level selected node, as well as the parent of the currently highest-level selected node. Here, highest level refers to the node that is closest to the root node. After step 404, the facility continues in step 402.

As an example of expanding the set of selected nodes in accordance with steps 403-404, consider generating a recommendation for one of the users in bucket 251 shown in FIG. 2, which contains only seven members and 18 ratings. If these values are below the threshold numbers being used by the facility, then in step 404 the facility expands the set of selected nodes from node 251 to nodes 241, 251, and 252, arriving at 479 total users and 3,443 total ratings between these three nodes. In some embodiments, where the set of selected nodes includes more nodes than just the user's node, ratings that came from a node other than the user's node are further adjusted and/or more lightly weighted. For example, where a bucket other than the user's bucket is part of the selected set of nodes, and it, unlike the user's bucket, is not defined based upon an answer indicating that its members like all kinds of people, the clientele rating for this other bucket will either be inflated or relatively lightly weighted when used to generate recommendations for this user.

In steps 405-408 the facility loops through each restaurant rated by the filtered ratings of the selected nodes. In step 406, the facility adjusts, then aggregates the filtered ratings that rate the current restaurant, such as by averaging them per category, or applying another statistical aggregation or summarization function, such as median, mode, etc. In step 407, the facility determines a score for the restaurant, such as a score reflecting the likelihood that the user to whom the recommendation is targeted will like the restaurant. In some embodiments, this score determination involves comparing the per-category aggregated ratings to an indication of how sensitive the user is to each of the rating categories. In step 408, if additional restaurants remain to be processed, then the facility continues in step 405, else the facility continues in step 409. In step 409, the facility displays for the top-scoring restaurants—such as the three highest-scoring restaurants—their aggregated ratings and their scores. After step 409, these steps conclude.

Figure 5:
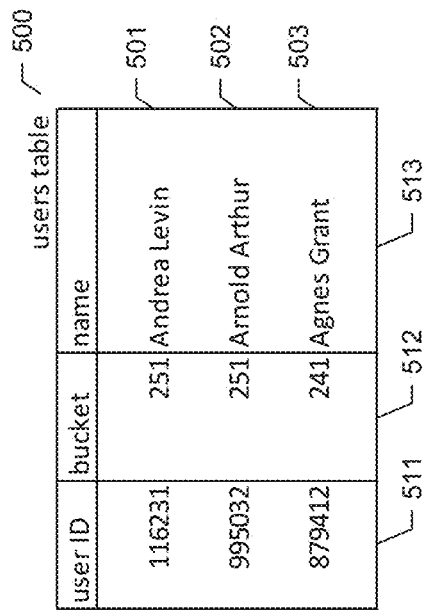
FIG. 5 is a table diagram showing sample contents of a users table used by the facility in some embodiments to store information about users using the facility.

FIGS. 5-8 are data structure diagrams showing sample data tables used by the facility in some embodiments. FIG. 5 is a table diagram showing sample contents of a user's table used by the facility in some embodiments to store information about users using the facility. The users table 500 is made up of rows such as rows 501-503 each corresponding to a different user. Each row is dividing into the following columns: a user id column 511 containing an identifier uniquely identifying the user within the facility; a bucket column 512 identifying the bucket to which the user is assigned; and a name column 513 containing the user's name, or nickname that the user uses in their use of the facility. For example, row 501 indicates that the user whose name is Andrea Levine has user id 116231, and is assigned to bucket 251.

While FIG. 5 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown, i.e., more or fewer rows, and/or more or fewer columns; may be compressed, encrypted, and/or indexed; etc.

Figure 6:
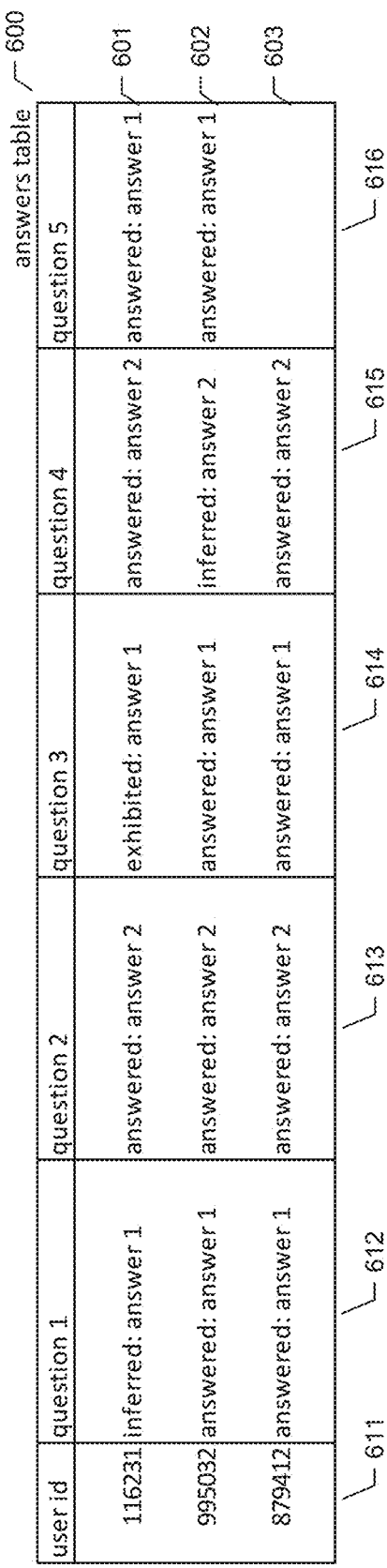
FIG. 6 is a table diagram showing sample contents of an answers table used by the facility in some embodiments to store answers given by users to questions, including answers to questions used by the facility to navigate the decision tree in order to assign users to a bucket.

FIG. 6 is a table diagram showing sample contents of an answers table used by the facility in some embodiments to store answers given by users to questions, including answers to questions used by the facility to navigate the decision tree in order to assign users to a bucket. The answers table 600 is made up of rows such as rows 601-603, each corresponding to a different user. Each row is divided into the following columns: the user id column 611; and columns 612-616 containing answers to questions posed by the facility attributed to the user by the facility. For example, row 601 shows that the user having user id 116231 answered question 2 with answer 2, question 4 with answer 2, and question 5 with answer 1. The facility inferred answer 1 to question 1, and determined that behavior of the user exhibited answer 1 to question 3. By comparing row 601 to the contents of the tree in FIG. 2, it can be seen that answer 1 to question 1 takes the user from node 201 to node 211; answer 2 to question 2 takes the user from node 211 to node 222; answer 1 to question 3 takes the user from node 222 to node 231; answer 2 to question 4 takes the user from node 231 to node 241; and answer 1 to question 5 takes the user from node 241 to node 251, which is consistent with the bucket number shown in row 501 of the users table. In some embodiments, inferred answers can replace empty columns; explicit answers can replace empty columns and inferred answers; and exhibited answers can replace empty columns, inferred answers, and explicit answers.

FIG. 7 is a table diagram showing sample contents of a restaurant's table used by the facility in some embodiments to store information about restaurants that the facility is able to recommend for presentation to a user in connection with a recommendation of a restaurant. The restaurant's table 700 is made up of rows such as rows 701-705, each corresponding to a different restaurant. Each of the rows is divided into the following columns: a restaurant id column 711 containing an identifier uniquely identifying a restaurant within the facility; a name column 712 containing the name of the restaurant; an address column 713 containing a postal address of the restaurant; and a telephone column containing a telephone number for the restaurant. For example, row 701 indicates that Tony's Grotto has a restaurant id of 5657, an address of 111 First Ave S. Seattle Wash. 98104, and a telephone number of 206-555-8797.

FIG. 8 is a table diagram showing sample contents of a ratings table used by the facility in some embodiments to store restaurant ratings contributed by users. The ratings table 800 is made up of rows 801-807, each corresponding to a different rating of a restaurant by a user. Each row is divided into the following columns: a user id column 811 containing the user identifier of the user who contributed the rating; a restaurant id column 812 containing the restaurant identifier of the restaurant that is rated by the rating; a channel column 813 indicating a dining scenario in the context of which the user rated the restaurant; a date column 814 containing the date on which the user contributed the rating; an atmosphere column 815 containing the user's rating value for the restaurant's atmosphere; a clientele column 816 containing the user's rating value for the restaurant's clientele; an service column 817 containing the user's rating value for the restaurant's service; a food quality column 818 containing the user's rating value for the restaurant's food quality; and an overall column 819 containing the user's rating value for the overall desirability of the restaurant. For example, it can be seen from row 801 that, on Apr. 11, 2015, the user having user id 116231 rated the restaurant having restaurant id 5687 for the casual lunch channel, and assigned an atmosphere rating of 5, a clientele rating of 3, a service rating of 5, a food quality rating of 1, and an overall rating of 3.

FIGS. 9-26 are display diagrams showing sample aspects of a visual user interface presented by the facility in some embodiments. These display diagrams show content formatted for presentation by a smartphone app provided by the facility; in various embodiments, the facility operates on devices of various types, including smartphones, tablets, laptop computers, desktop computers, automobile computers, navigation devices, etc., using user interfaces adapted to these device types.

Figure 9:
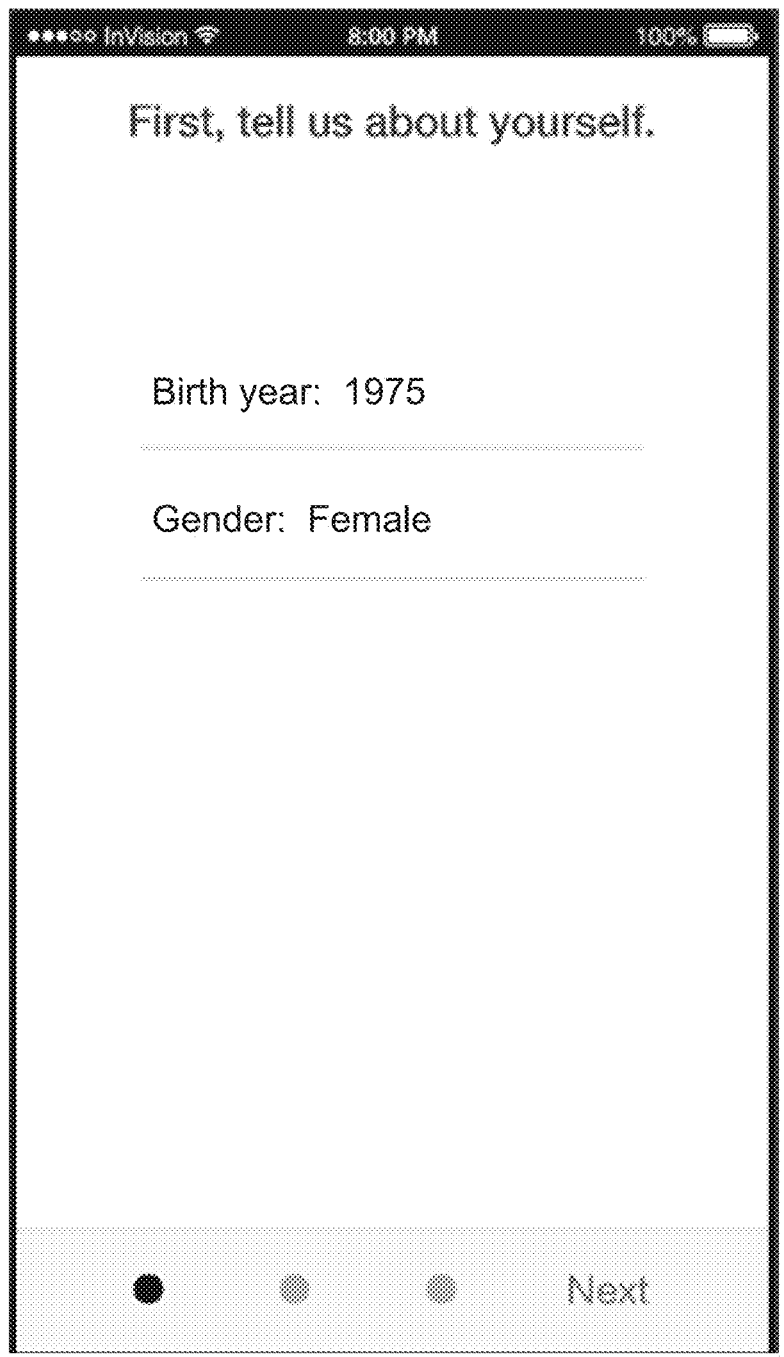
FIGS. 9-26 are display diagrams showing sample aspects of a visual user interface presented by the facility in some embodiments.

FIG. 9 shows a display into which the user can answer demographic information, such as the user's birth year and sex.

Figure 10:
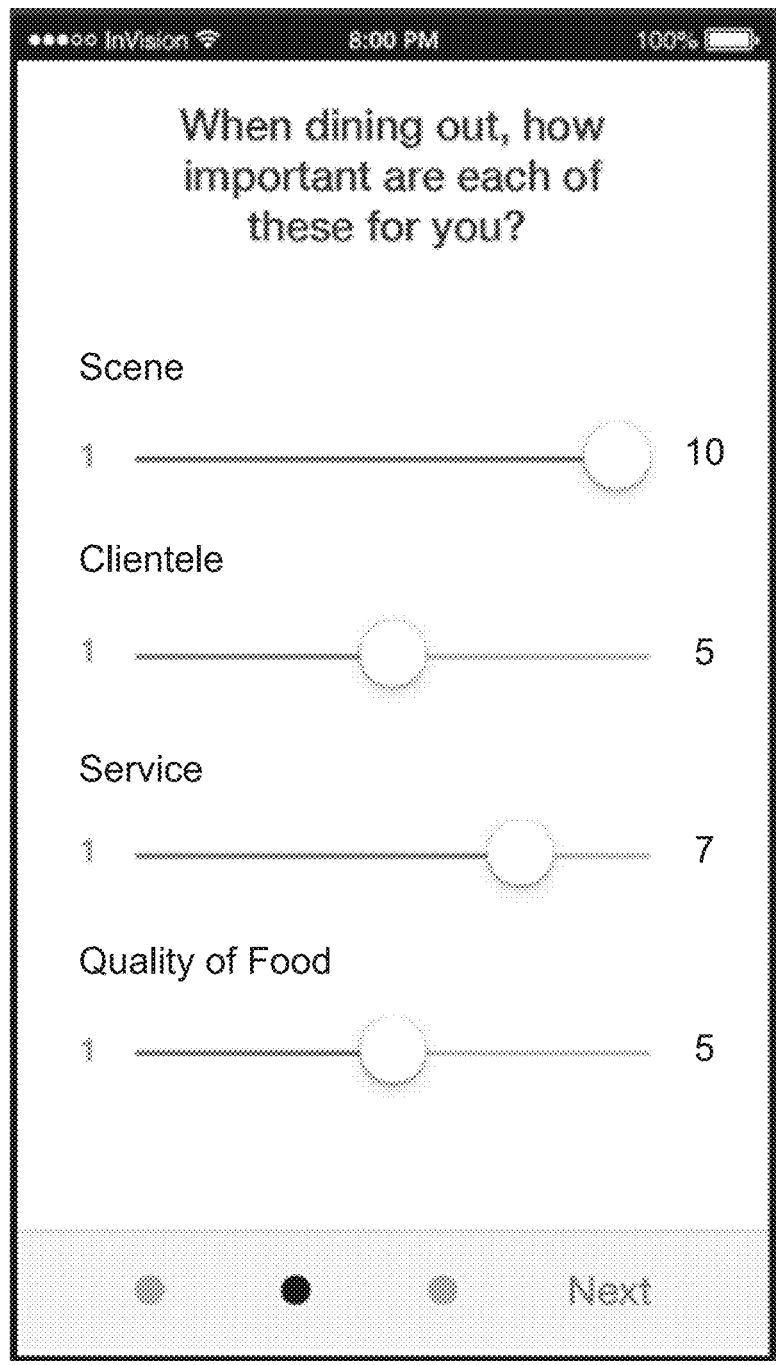

FIG. 10 is a display in which the user can specify the importance of different rating categories used by the facility, such as scene or atmosphere, clientele, service, and food quality. In some embodiments, these importance measures are used (1) as a basis for adjusting this user's restaurant ratings before they are aggregated as the basis for making a recommendation to another user, and/or (2) to calculate, when recommending restaurants to this user, the likelihood that the user will like the restaurant, based upon the category ratings aggregated from the user's peers. For example, if this user indicates that clientele is not very important, his or her ratings in the clientele category will be given less weight in aggregated ratings; further, the facility will determine this user to have a higher likelihood of liking a restaurant whose aggregated clientele rating is low, as compared to another user who is identical except for placing more importance on the clientele rating.

Figure 11:
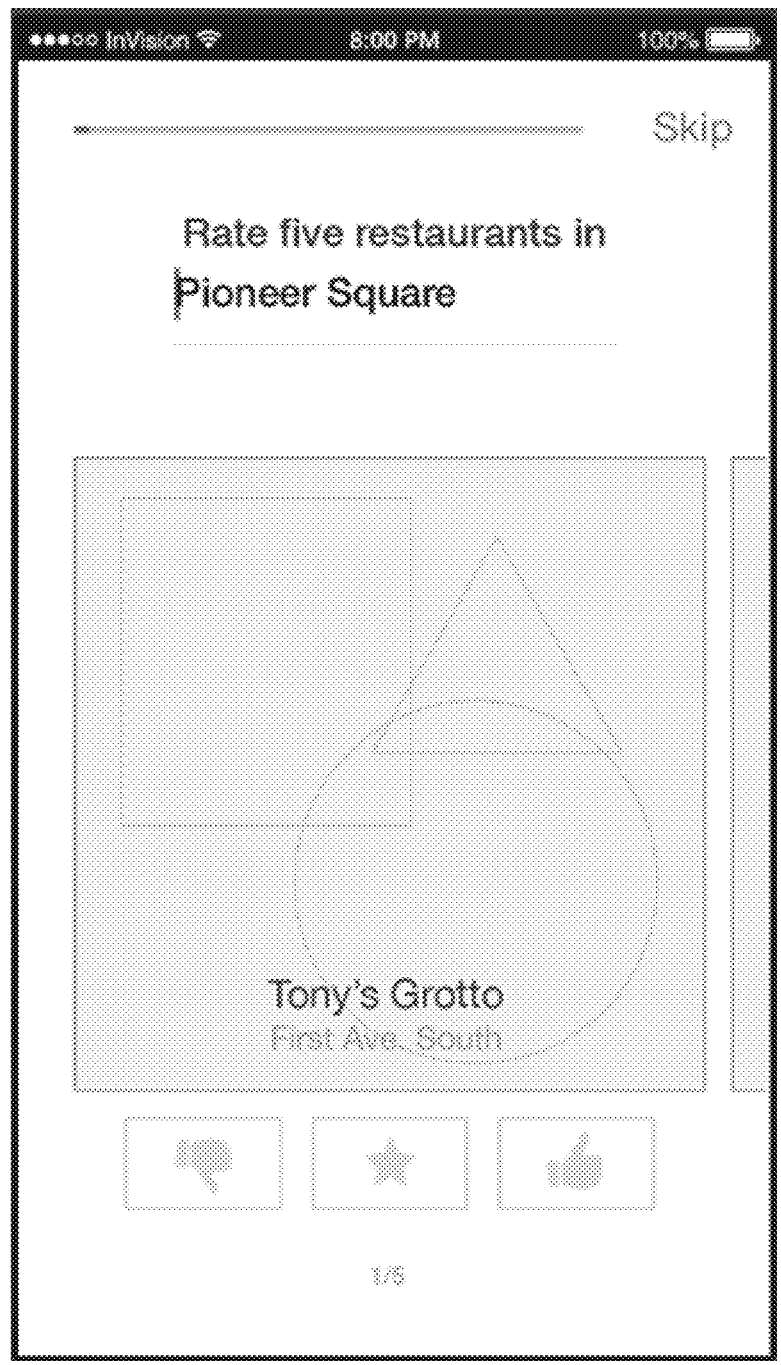

FIG. 11 shows a display the user can designate a summary weighting, e.g., thumbs-up or thumbs-down, for a first restaurant.

Figure 12:
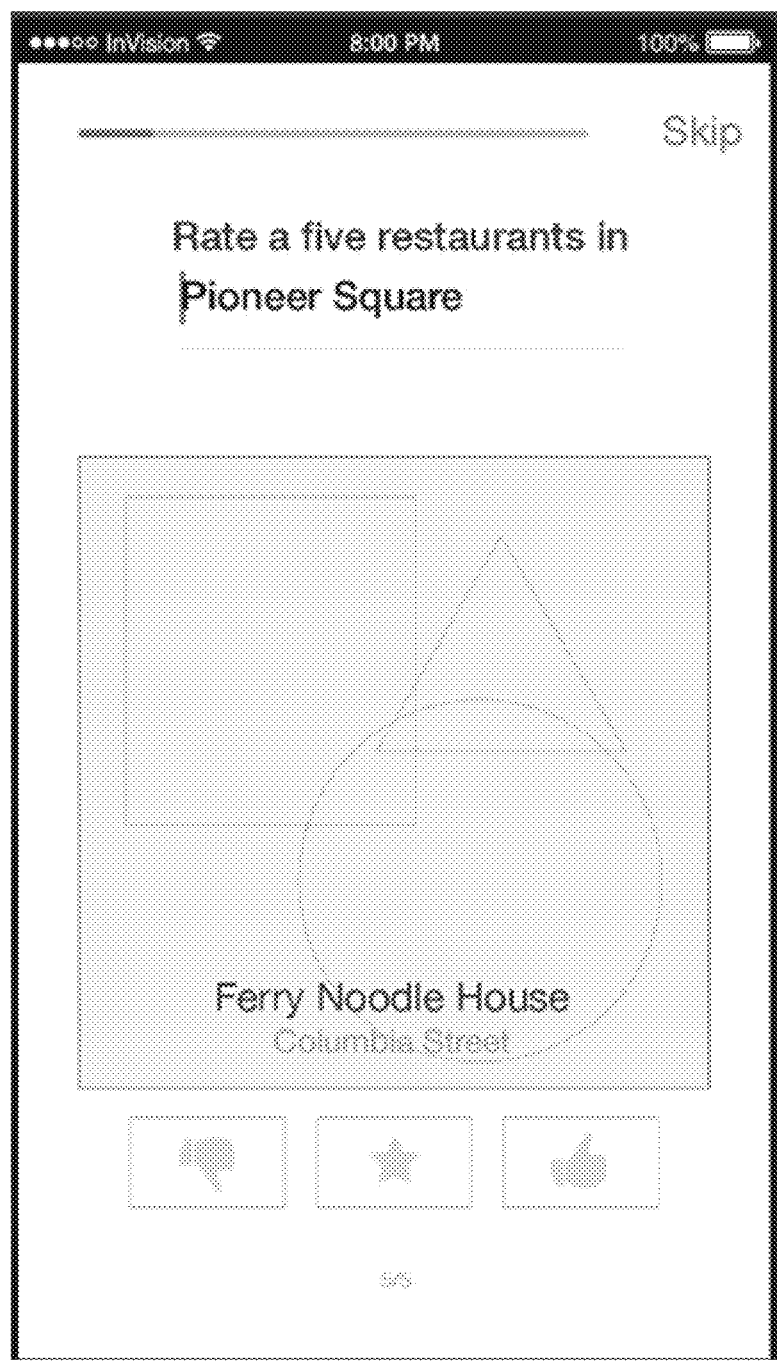

FIG. 12 shows a display that enables the user to provide a summary rating of a second restaurant.

Figure 13:
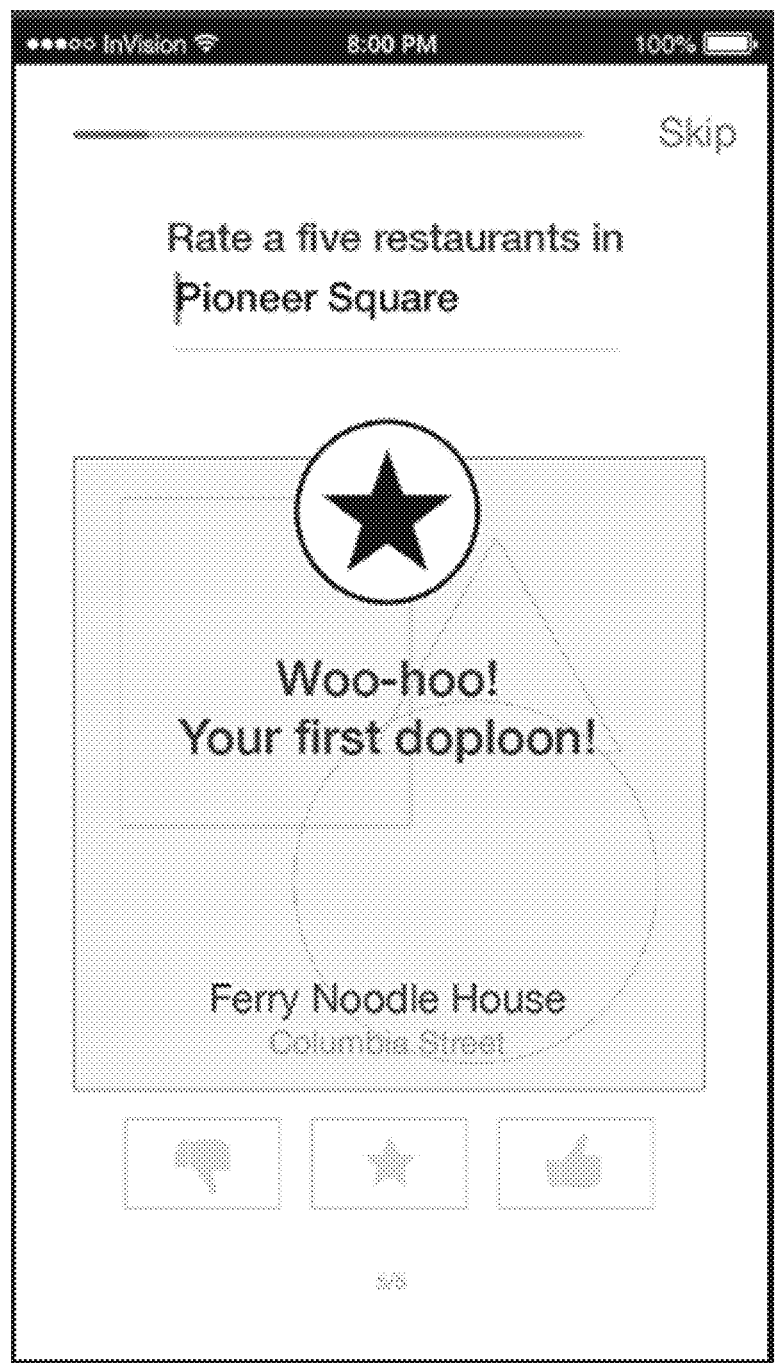

FIG. 13 shows a display in which the user is rewarded for providing the foregoing information with a virtual award, here a virtual currency and/or a graphical badge.

Figure 14:
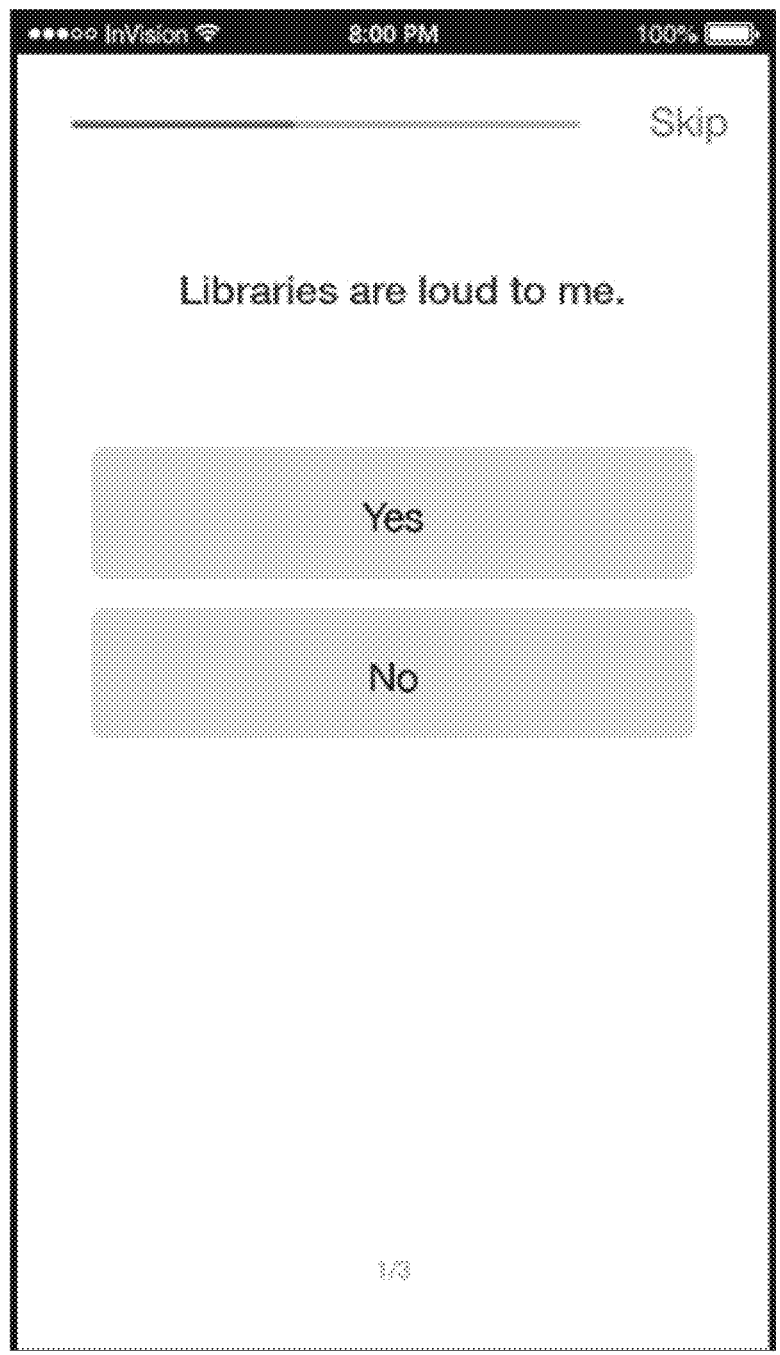

FIG. 14 shows a display containing a subjectivity measure, or "subjectivity dial," question, "Libraries are loud to me." The answer to this question helps the facility to gauge the meaning of the relative sound measurement "loud" to this user. Other subjectivity dial questions allow the facility to gauge various other subjective measurements of the user. In some embodiments, subjectivity dial questions involve showing or playing a media artifact to the user, and asking whether the depiction qualifies for a particular subjective measure. Examples used by the facility in some embodiments include asking of a photograph of a restaurant dining room whether it is "high-end," "well-maintained," or "cozy." The facility may play a particular kind of sound and ask whether it is loud. The facility may play a short video clip of a server speaking to a patron and ask whether the server qualifies as groveling.

Figure 15:
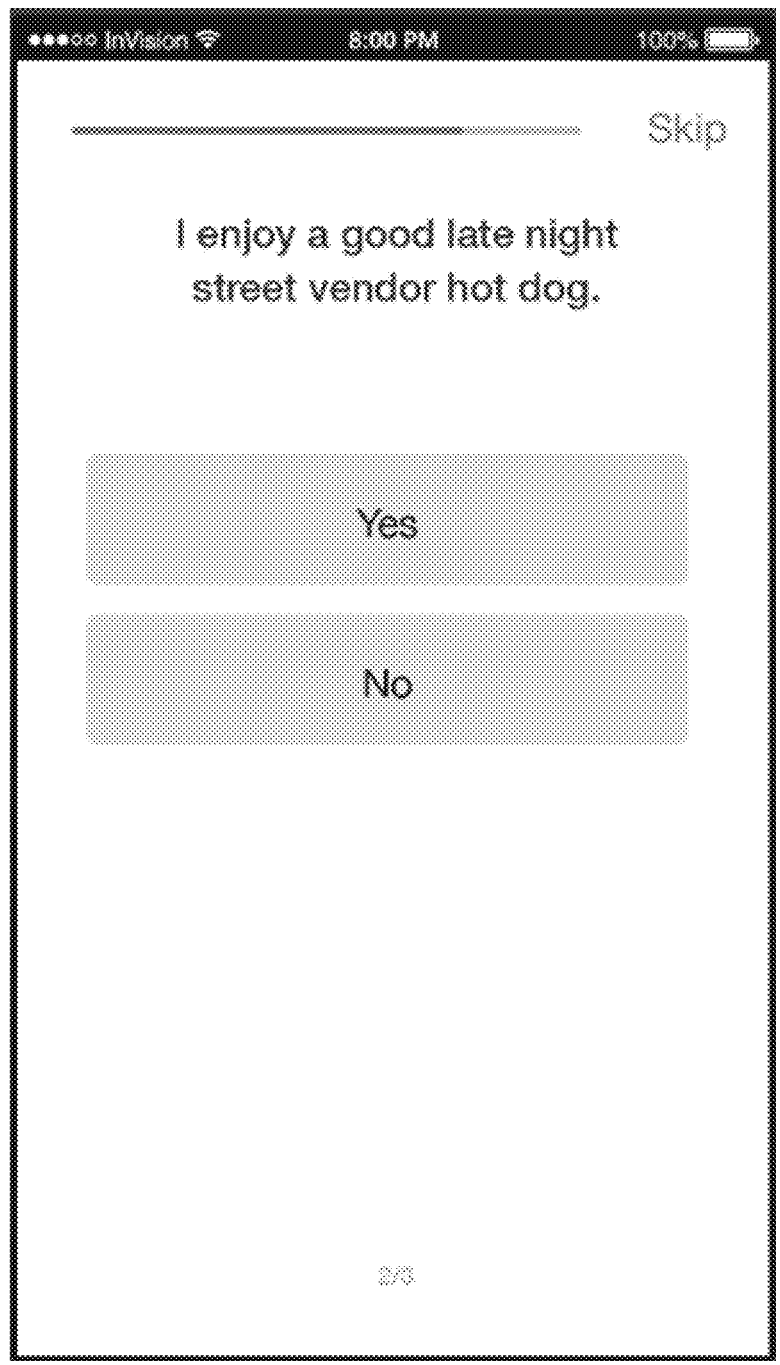

FIG. 15 shows a display in which the user can answer a question that has the potential to support inferred answers about a number of other questions: "I enjoy a good late night street vendor hotdog."

Figure 16:
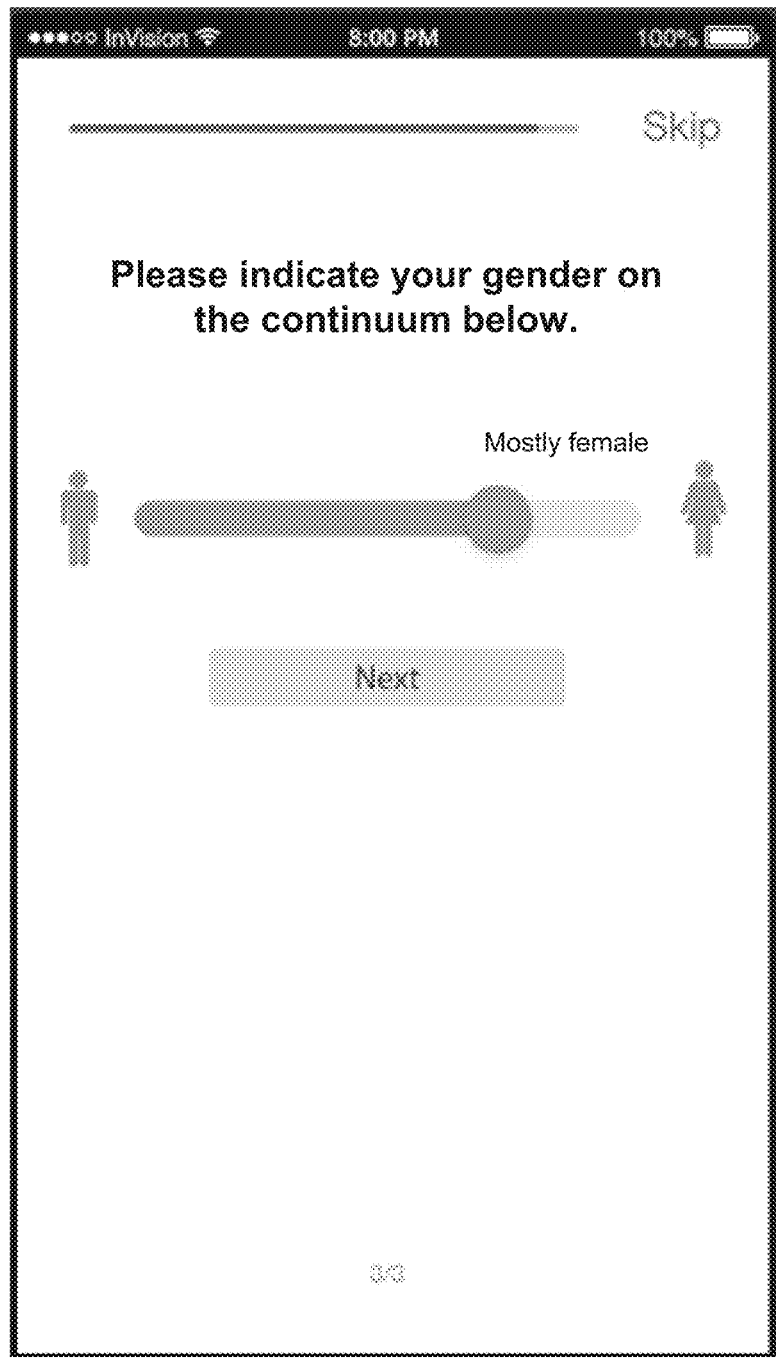

FIG. 16 shows a display that permits the user to indicate his or her gender identity on a continuum between male and female.

Figure 17:
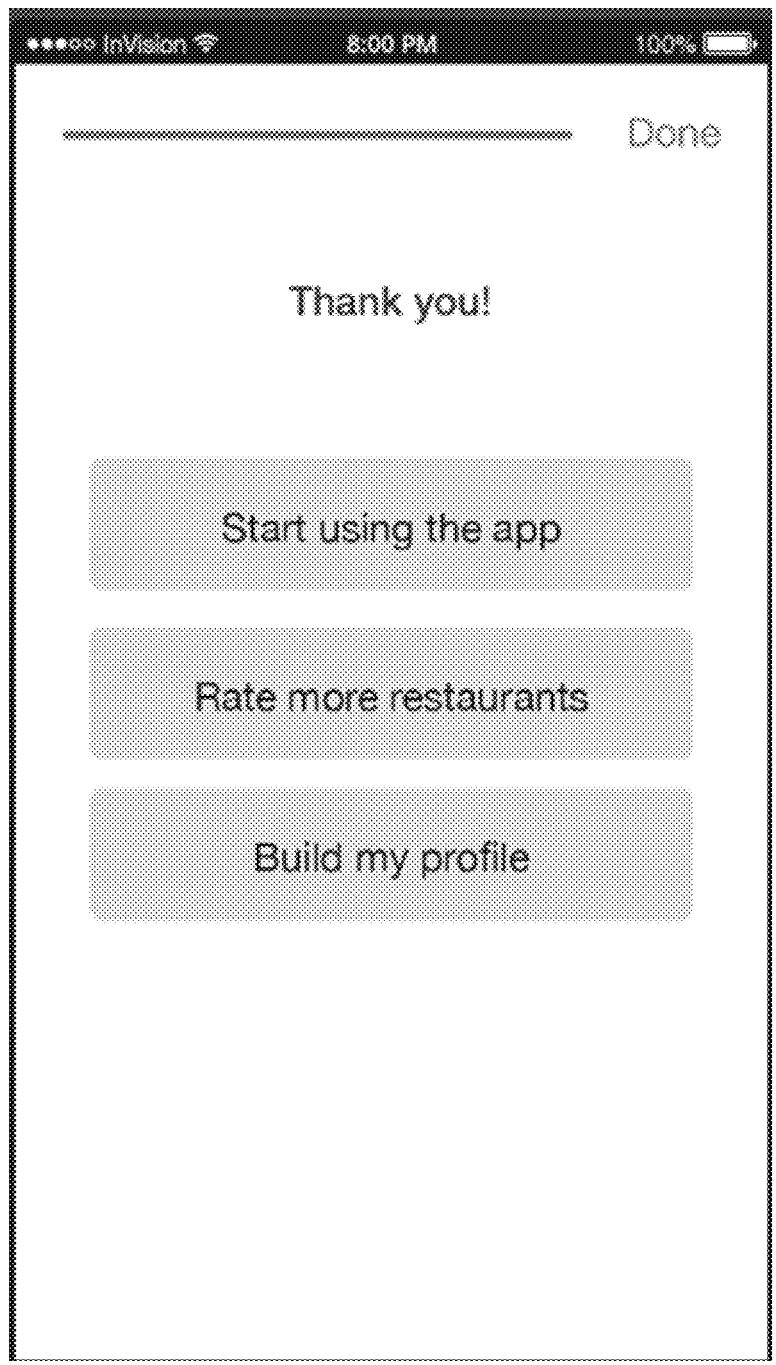

FIG. 17 is a display that indicates the initial profile setup is completed, and that the user can begin seeking restaurant recommendations, rate restaurants, or further define their profile, such as answering additional questions.

Figure 18:

FIG. 18 is a display showing the time and the user's location, and permitting the user to choose among channels—i.e., dining scenarios—as a basis for recommending a restaurant. These include, for example, "business lunch," "casual lunch," "happy hour," "outside dining," "business drinks," etc. In some embodiments, the facility displays channels in a manner that is sensitive to factors such as the time, the user's location, or another location specified by the user, channels that the user has selected for a recommendation before and/or chosen to be shown versus hidden, etc.

Figure 19:
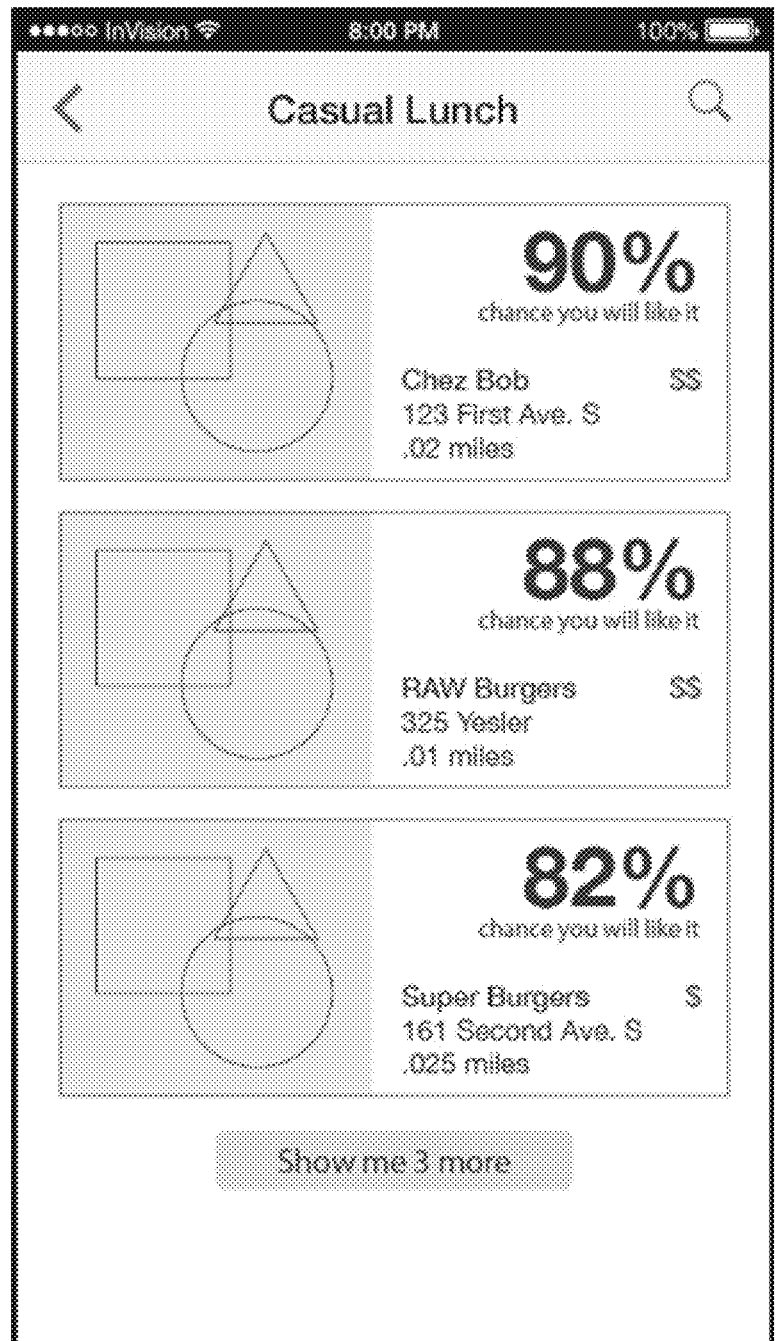

FIG. 19 shows a display in which the facility recommends restaurants to the user for the "casual lunch" channel. The top recommendation is the restaurant "Chez Bob," which has received the highest likelihood that the user will like it-90%—based upon its aggregated ratings among users in the same bucket or nearby buckets being the highest in the categories that the user has indicated they care most about. In the embodiments shown, the facility shows the top three recommendations, with the option of displaying the next three.

Figure 20:
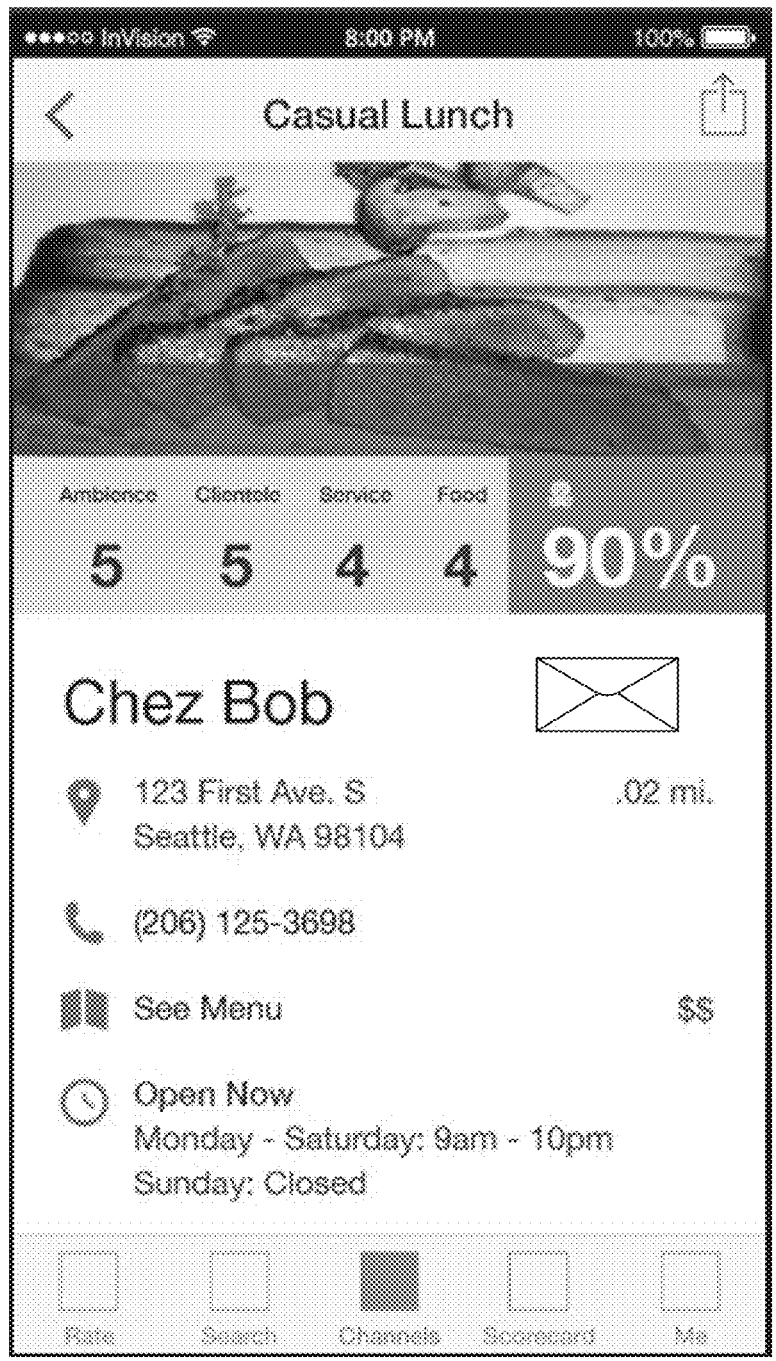

FIG. 20 shows a display containing details about the top recommendation, Chez Bob. It includes the per-category aggregated ratings, as well as the probability that the user will like it. It contains additional information about the restaurant, such as its address and distance, its phone number, its menu, and its open hours. The display also includes a messaging control that the user may activate in order to invite others to visit the restaurant with them.

Figure 21:
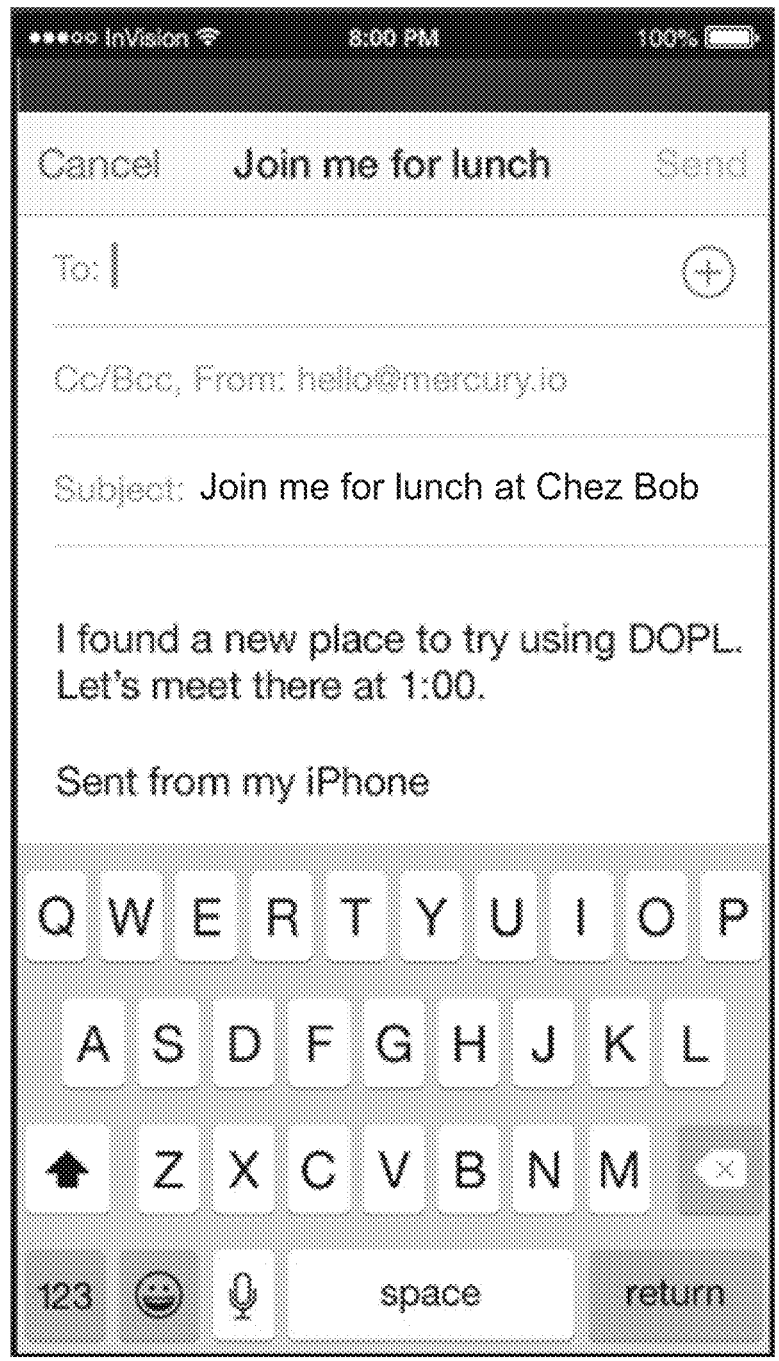

FIG. 21 shows a display in which the facility pre-populates an email message inviting others to join the user at the restaurant. The user can fill in identifying information for the others to invite, and activate the send control in order to send the invitation, such as by email, text, social network platform message, etc.

Figure 22:
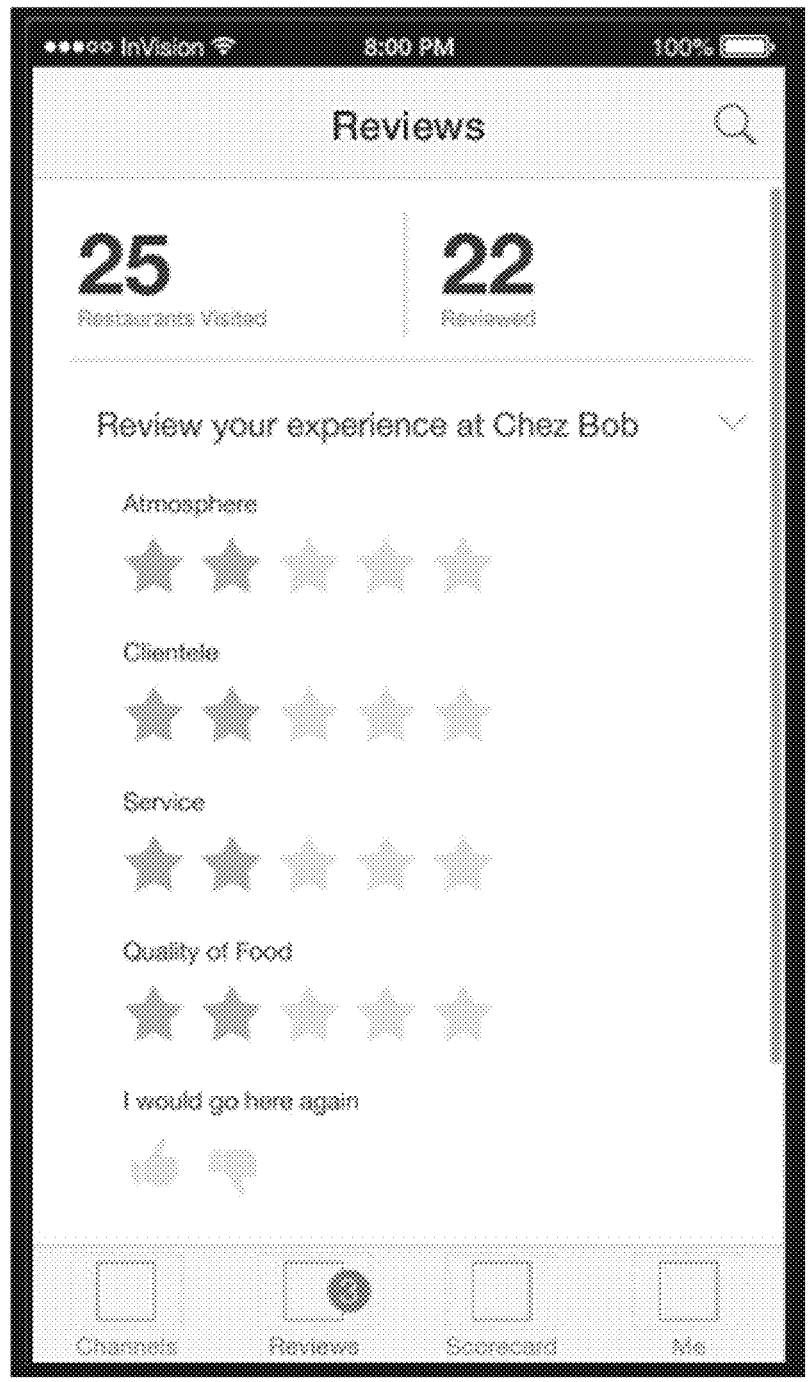

FIG. 22 shows a display that allows the user to contribute a rating of Chez Bob after eating there. In particular, the user can specify a rating in each category, such as atmosphere, clientele, service, food quality, and overall.

Figure 23:
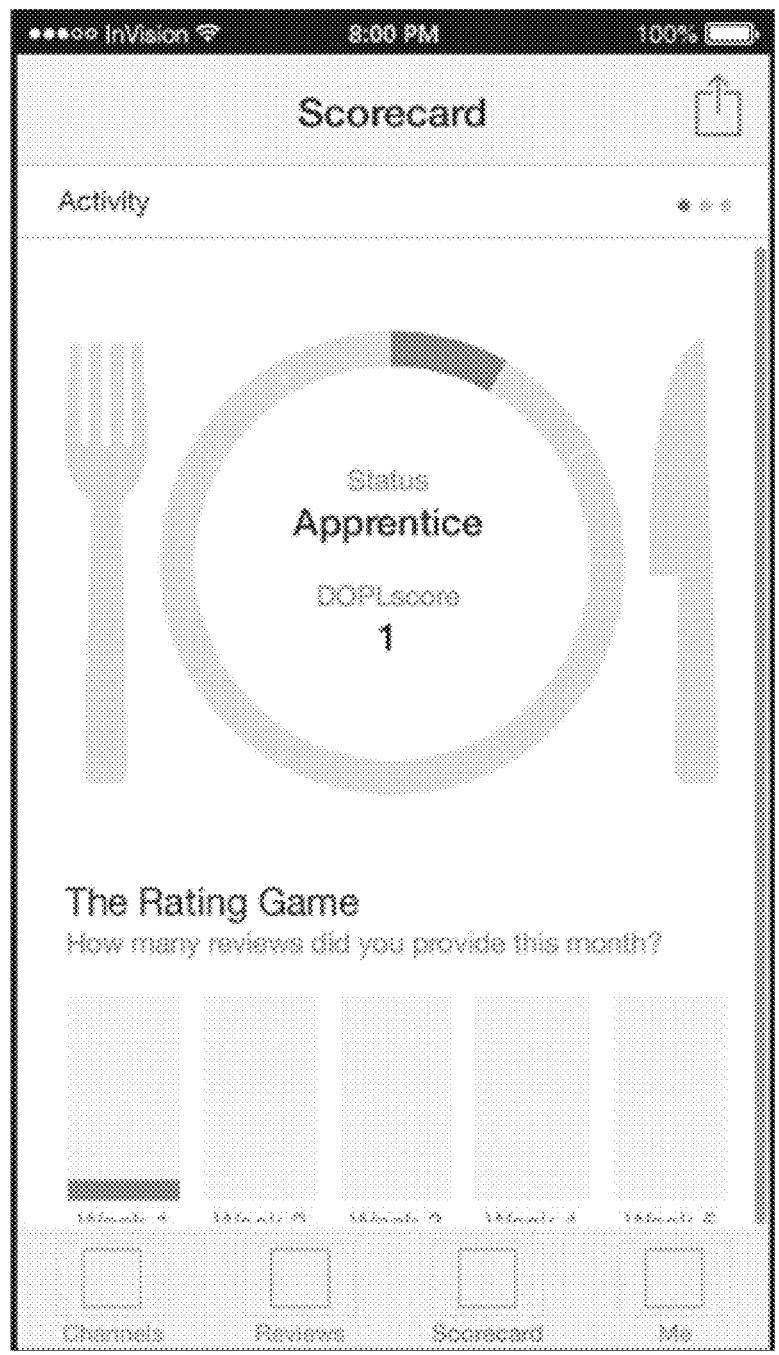

FIG. 23 shows a scorecard showing the user's interaction with the facility, including the number of restaurants that the user has rated in which of the last five weeks.

Figure 24:
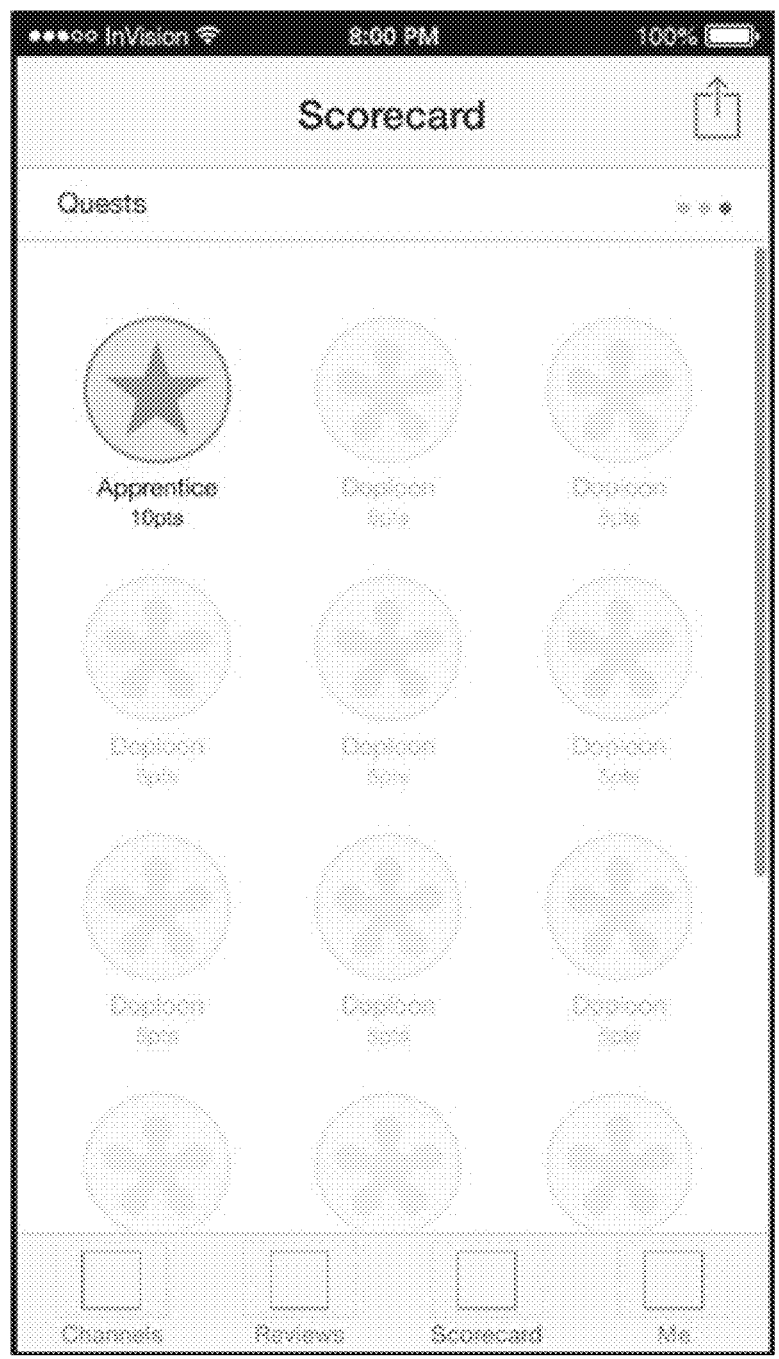

FIG. 24 shows a display enumerating badges and other rewards the user has received from the facility.

Figure 25:
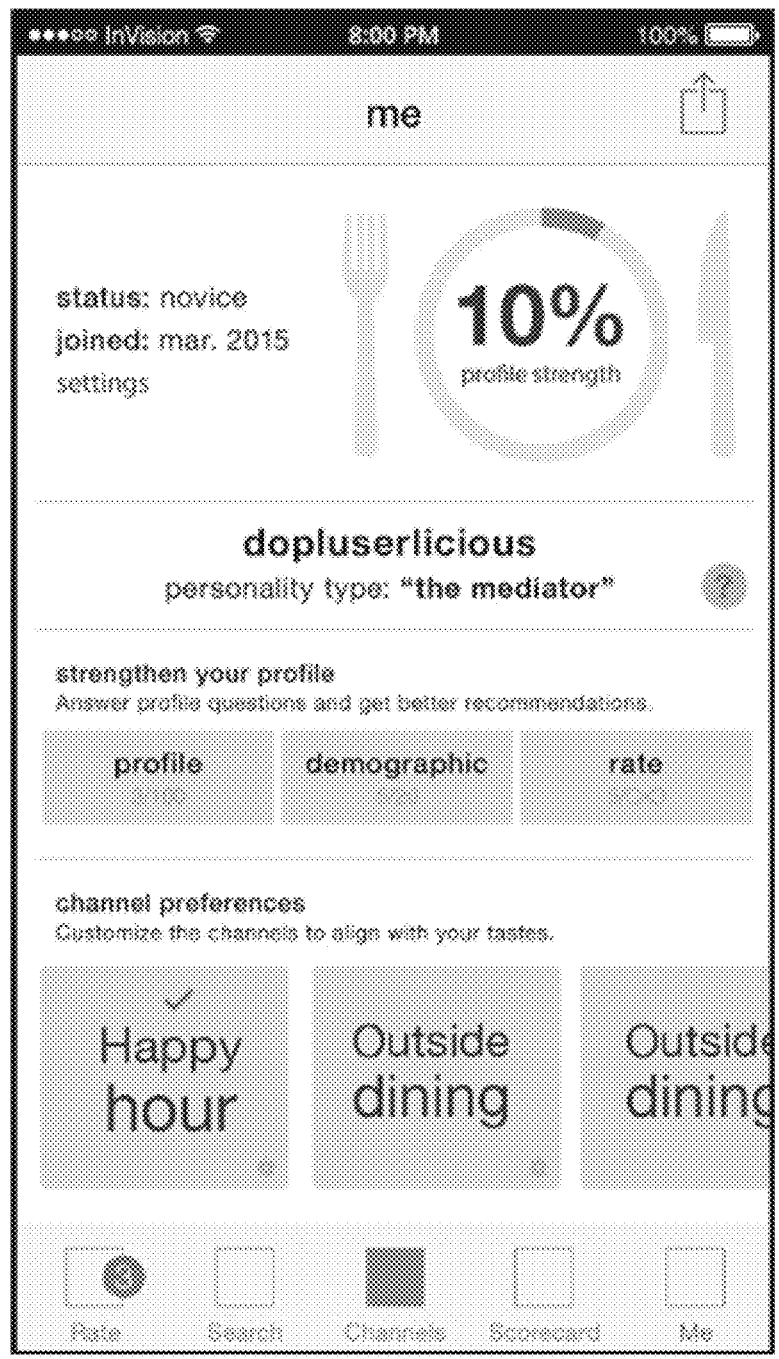

FIG. 25 shows a display containing summary information about the user's account, and that permits the user to change or extend the information provided as a basis for receiving improved recommendations from the facility.

Figure 26:
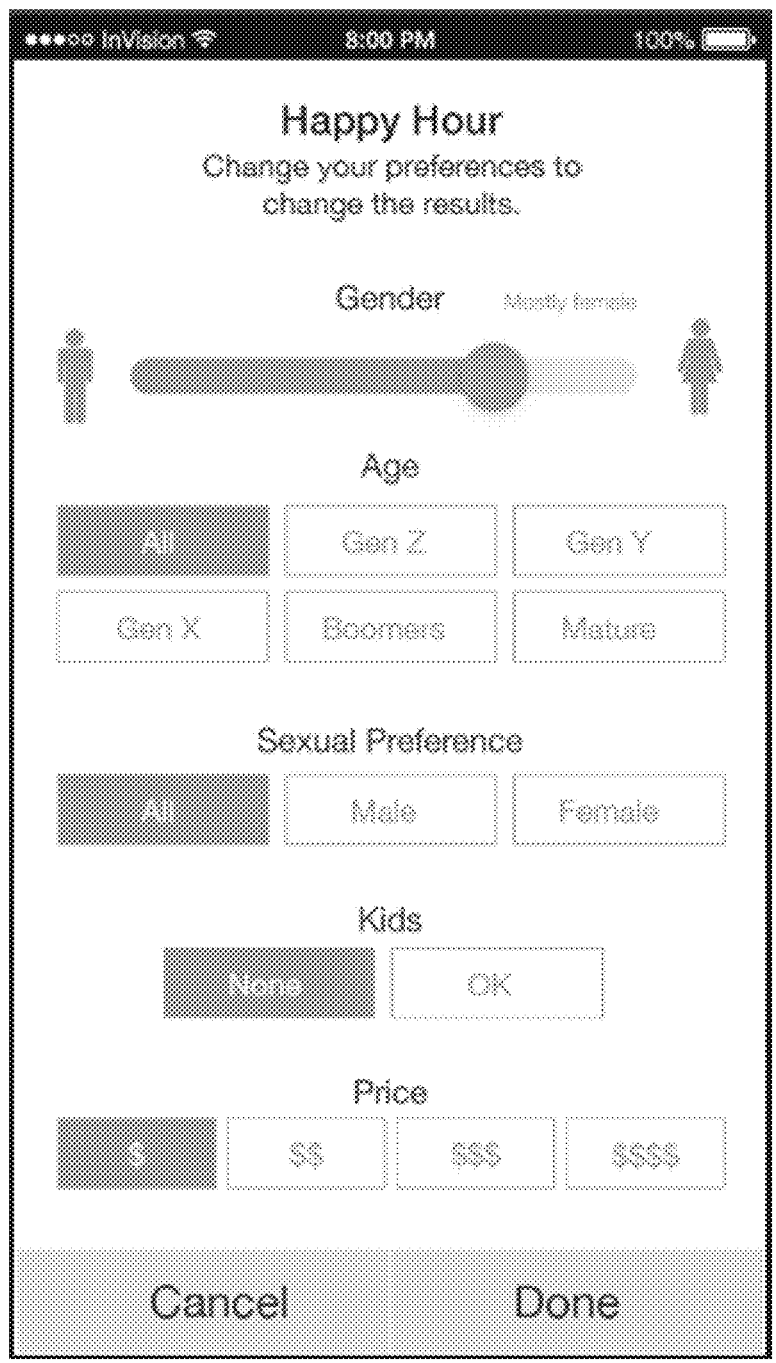

FIG. 26 shows a display in which the user can temporarily alter his or her profile information to receive recommendations that are well-suited to someone else, that are out of character for themselves, or that are otherwise interesting for the user to review. In some embodiments, these changes are temporary, and are afterward easily or even automatically reverted to original profile contents.

In various embodiments, the facility uses various questions to elicit information from the user, such as various combinations of questions including those shown in Table 1 below.

TABLE 1

Libraries are loud to me - yes/no
I enjoy Korean food - yes/no
My gender is - male/female/intermediate
Bars should be - quiet/loud - yes/no
I love to host dinner parties - yes/no
Quality of food is - More important than price/Less important than price
I like it when other patrons leave me alone - yes/no
I enjoy a good late night street hot dog - yes/no
Restaurants should be - quiet/loud - yes/no
I regularly cook meals from fresh ingredients - yes/no
Large portion size is more important than quality - yes/no
I like for other patrons to be like me - yes/no
I like bars where I can use my normal speaking voice and the people I'm with can hear me easily - yes/no
I like tattooed wait staff - yes/no
I like my wait staff to be flirty - yes/no
A few people talking and a string quartet playing Chopin is loud to me - yes/no
Wait staff should - be attentive to my every need/leave me alone - yes/no
I enjoy authentic Chinese food - yes/no
I value - slow food/meals I can get and eat quickly/what does this mean? - yes/no TABLE 1-continued I like firing up the grill and buying some brews/linens on the table and place settings/both/I don't have people over for meals - yes/no
I like a surly, gruff, tattooed but friendly wait staff or bartender - yes/no
Libraries are quiet to me - yes/no
I like it when other patrons - initiate talking with me/are receptive to me - yes/no
I like to be in bars that are so loud, I have to yell to be heard by the people I am talking to - yes/no
As an adult, I have travelled for pleasure to - 0-2 foreign countries/3 or more foreign countries
I have travelled for business to - 0-2 foreign countries/3 or more foreign countries
I want to be a world traveler - yes/no
I think of myself as a world traveler - yes/no
As an adult, I have lived for more than 6 months overseas - yes/no
The aesthetics of food presentation matters - always/often/sometimes/never
As far as conversations with waitstaff go, I like the following - long talks/brief exchanges
I like wait staff to be dressed - choose all that apply: casual, formal, costumed, all female, all male, sexy male scantily clad, sexy female scantily clad
I don't want to be rushed, let me enjoy the ambience, a drink, some conversation then I'll order each course as I get to it - yes/no
If I were a pet I would be - a dog/a cat/an alligator
I enjoy venues where I'm the only person or couple there - yes/no
I enjoy standing room only venues - yes/no
I consider myself a foodie - yes/no
I like my wait staff to be friendly - yes/no
I like other patrons to be - Urban/Suburban/Rural
Wait staff rush me so they can get the next table in - yes/no
If wait staff try to obviously push products on me or upsell me - yes/no
I like my waitstaff to be - just like me/not like me at all
I like wait staff to be knowledgeable enough about food and drink to make recommendations - yes/no
I like my wait staff to be aloof - yes/no
I ___ feel like, I'm sitting here why isn't my food already on the way - often/seldom or never It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computer-readable hardware device having contents adapted to cause a computing system to perform a method for producing an item recommendation for a selected user, the method comprising:
  accessing an information resource organized at least in part by a tree-structure, wherein the tree-structure:
    (a) includes a plurality of buckets each corresponding to a different collection of personal information, and
    (b) for each of the plurality of buckets, identifies: (i) users who are members of the bucket and to each of whom the entire collection of personal information of the bucket applies, and (ii) a number of item ratings contributed by the users,
      wherein evaluations by a first set of members of a bucket are predictive of an experience that a second set of members of the bucket will have when the second set of members make a same choice as the first set of members;
  selecting a bucket among the plurality of buckets of which the selected user is a member;
  accessing a plurality of item ratings each contributed by a member of the selected bucket other than the selected user;
  for each of a plurality of items rated among the accessed item ratings, aggregating the ratings of the item; and on the basis of the items' aggregated ratings, selecting one or more rated items from the plurality of items for recommendation to the selected user, wherein the recommendation comprises a likelihood that the selected user will like the one or more rated items.

2. The computer-readable hardware device of claim 1, further comprising causing the selected items to be presented to the selected user.

3. The computer-readable hardware device of claim 1 wherein the selected items are restaurants.

4. The computer-readable hardware device of claim 1 wherein the selected items are movies.

5. The computer-readable hardware device of claim 1 wherein the selected items are political candidates.

6. The computer-readable hardware device of claim 1 wherein the information resource is a classifying decision tree.

7. The computer-readable hardware device of claim 1 wherein the information resource includes information identifying related buckets whose collections of personal information are the most similar, and wherein the method further comprises:
   determining that the number of item ratings from the selected bucket is below a threshold number of item ratings; and
   in response to the determining, accessing item ratings from a bucket related to the selected bucket, wherein the aggregation of item ratings is also performed with respect to the accessed item ratings from the bucket related to the selected bucket.

8. The computer-readable hardware device of claim 1 wherein the method further comprises:
   determining that a distinguished one of the accessed item ratings was contributed by a member of the selected bucket who, in addition to having the collection of personal information to which the selected bucket corresponds, also has distinguished personal information not among the collection of personal information to which the selected bucket corresponds; and
   before including the distinguished item rating in the aggregation, adjusting the distinguished item rating in accordance with the distinguished personal information.

9. The computer-readable hardware device of claim 1 wherein the each of the accessed plurality of item ratings comprises a rating value for each of a plurality of rating categories, and wherein, for each of a plurality of items rated among the accessed item ratings, the aggregating produces an aggregated value for each of the plurality of rating categories.

10. The computer-readable hardware device of claim 1 wherein the method further comprises:
   for each of the selected items, on the basis of the selected item's aggregated ratings, determining a quantitative likelihood that the selected user will like the selected item.

11. The computer-readable hardware device of claim 10 wherein the method further comprises:
   for each of the selected items, causing information identifying the selected item to be presented together with the quantitative likelihood determined for the selected item.

12. The computer-readable hardware device of claim 1 wherein the method is performed in response to a request from a user other than the selected user.

13. The computer-readable hardware device of claim 1, the method further comprising:
   determining which of the plurality of buckets to select based upon distinguished personal information temporarily attributed to the selected user.

14. The computer-readable hardware device of claim 13, the method further comprising:
   after selecting one or more items for recommendation to the selected user:
      deattributing the distinguished personal information from the selected user; and
      determining one of the plurality of buckets to select for the selected user in the absence of the distinguished personal information.

15. The computer-readable hardware device of claim 1 wherein the selected user is an artificial user constituted from personal information of a plurality of constituent users, and wherein the method is performed in response to a request from one of the constituent users.

16. The computer-readable hardware device of claim 15, the method further comprising:
   for each of the constituent users:
      selecting a bucket among the plurality of buckets of which the constituent user is a member;
      accessing a plurality of item ratings each contributed by a member of the selected bucket other than the constituent user and each rating a selected item;
      aggregating the accessed ratings of the selected item; and
      displaying an indication of the result of aggregating the accessed ratings in connection with information identifying the constituent user.

17. The computer-readable hardware device of claim 16 wherein each of the accessed plurality of item ratings comprises a rating value for each of a plurality of rating categories, and wherein the aggregating produces an aggregated value for each of the plurality of rating categories.

18. The computer-readable hardware device of claim 1 wherein the method further comprises:
   before the selecting the one or more rated items for recommendation, adjusting the rating aggregation for at least one rated item to reflect a confidence level.

19. The computer-readable hardware device of claim 1 wherein the method further comprises:
   determining that the selected user, in addition to having the collection of personal information to which the selected bucket corresponds, also has distinguished personal information not among the collection of personal information to which the selected bucket corresponds; and
   before the selecting the items for recommendation, adjusting the rating aggregation for at least one rated item to reflect the distinguished personal information.

20. The computer-readable hardware device of claim 1 wherein the item recommendation is being produced with respect to a selected item consumption scenario among the plurality of item consumption scenarios, and wherein each of the accessed plurality of item ratings is qualified by at least one of the plurality of item consumption scenarios, and wherein the method further comprises:
   before aggregating the accessed item ratings, removing from the accessed item ratings item ratings not qualified by the selected item consumption scenario.

* * * * *